US00RE50104E

(19) United States
(12) Reissued Patent
Kim

(10) Patent Number: US RE50,104 E
(45) Date of Reissued Patent: Aug. 27, 2024

(54) PRIVATE MULTIMEDIA CONTENTS BROADCASTING EQUIPMENT WHICH USES ISM RADIO FREQUENCY BAND OR U-NII 5GHZ RADIO FREQUENCY BAND, PRIVATE MULTIMEDIA CONTENTS BROADCASTING SYSTEM AND METHOD THEREOF

(71) Applicant: INTELLECTUAL DISCOVERY CO., LTD., Seoul (KR)

(72) Inventor: Jeen-Gee Kim, Icheon-si (KR)

(73) Assignee: INTELLECTUAL DISCOVERY CO., LTD., Seoul (KR)

(21) Appl. No.: 17/021,919

(22) Filed: Sep. 15, 2020

Related U.S. Patent Documents

Reissue of:
(64) Patent No.: 10,164,935
Issued: Dec. 25, 2018
Appl. No.: 14/955,767
Filed: Dec. 1, 2015

U.S. Applications:
(63) Continuation of application No. 17/021,314, filed on Sep. 15, 2020, which is an application for the reissue (Continued)

(30) Foreign Application Priority Data

Jan. 5, 2008 (KR) ..... 10-2008-0001509
Sep. 18, 2008 (KR) ..... 10-2008-0091660

(51) Int. Cl.
*H04L 29/12* (2006.01)
*H04H 20/61* (2008.01)

(Continued)

(52) U.S. Cl.
CPC ..... *H04L 61/5007* (2022.05); *H04H 20/61* (2013.01); *H04L 61/5061* (2022.05); *H04L 65/1069* (2013.01)

(58) Field of Classification Search
CPC ..... H04L 61/2007; H04L 61/2061; H04L 65/1069; H04H 20/61; H04H 20/71; H04H 60/23; H04N 21/2743; H04N 21/6175
See application file for complete search history.

(56) References Cited

U.S. PATENT DOCUMENTS 5,905,872 A * 5/1999 DeSimone et al. ..... H04L 12/5692 370/401
5,944,768 A * 8/1999 Ito ..... G01C 21/3446 340/990

(Continued)

FOREIGN PATENT DOCUMENTS

CN 1599344 A 3/2005
CN 2842562 Y 11/2006

(Continued)

*Primary Examiner* — Colin M LaRose
(74) *Attorney, Agent, or Firm* — Sughrue Mion, PLLC

(57) ABSTRACT

An individual multimedia contents broadcasting equipment is disclosed, which includes an individual broadcast process unit which provides a private IP through a DHCP (Dynamic Host Configuration Protocol) to a receiving terminal, which requests a connection, and makes a connection of the receiving terminal through a radio network, and transmits a broadcast content to the connected receiving terminal; and a radio communication unit which forms a radio network and communicates data with the connected receiving terminal through the radio network.

36 Claims, 6 Drawing Sheets

Related U.S. Application Data of Pat. No. 10,164,935, which is a continuation of application No. 13/837,808, filed on Mar. 15, 2013, now Pat. No. 9,210,123, which is a continuation of application No. 12/446,768, filed as application No. PCT/KR2008/005768 on Oct. 1, 2008, now Pat. No. 8,660,116.

(51) Int. Cl.

| | |
|---|---|
| ***H04L 29/06*** | (2006.01) |
| ***H04L 61/5007*** | (2022.01) |
| ***H04L 61/5061*** | (2022.01) |
| ***H04L 65/1069*** | (2022.01) |

(56) References Cited

U.S. PATENT DOCUMENTS

| | | | | |
|---|---|---|---|---|
| 6,216,152 | B1 * | 4/2001 | Wong | G06F 9/44526 707/999.103 |
| 6,421,714 | B1 * | 7/2002 | Rai | H04L 12/4633 455/422.1 |
| 6,768,743 | B1 | 7/2004 | Borella et al. | |
| 6,847,649 | B2 * | 1/2005 | Sutanto | H04L 12/2801 370/401 |
| 7,054,944 | B2 | 5/2006 | Tang et al. | |
| 7,725,255 | B2 * | 5/2010 | Kawakami | B60K 35/00 340/995.14 |
| 8,022,989 | B2 * | 9/2011 | Aoki | H04N 21/4334 348/158 |
| 8,370,888 | B2 * | 2/2013 | Zimmermann | H04N 21/2187 709/226 |
| 8,660,116 | B2 * | 2/2014 | Kim | H04H 20/61 370/338 |
| 9,210,123 | B2 * | 12/2015 | Kim | H04H 20/61 |
| 2002/0080854 | A1 * | 6/2002 | Rebhan | H04B 1/7143 375/132 |
| 2004/0090958 | A1 | 5/2004 | Park et al. | |
| 2004/0229655 | A1 * | 11/2004 | Jang | H04H 60/27 455/566 |
| 2005/0005025 | A1 * | 1/2005 | Harville | H04L 29/06027 709/241 |
| 2005/0073964 | A1 * | 4/2005 | Schmidt | H04L 29/06027 370/260 |
| 2006/0023803 | A1 * | 2/2006 | Perlman | H04B 7/0684 375/267 |
| 2006/0218296 | A1 | 9/2006 | Sumner | |
| 2007/0149171 | A1 * | 6/2007 | Cho | H04W 12/06 455/411 |
| 2007/0274344 | A1 * | 11/2007 | Yang | H04L 29/06027 370/486 |
| 2007/0275696 | A1 * | 11/2007 | Cheng | H04L 51/04 455/412.1 |
| 2008/0005767 | A1 * | 1/2008 | Seo | H04N 21/64322 725/62 |
| 2008/0037507 | A1 * | 2/2008 | Fukumoto | H04B 1/18 370/347 |
| 2008/0102809 | A1 * | 5/2008 | Beyer | H04M 1/7243 455/420 |
| 2008/0136841 | A1 * | 6/2008 | Oshitani | G01C 21/3673 345/636 |
| 2008/0219230 | A1 | 9/2008 | Lee et al. | |
| 2009/0158360 | A1 * | 6/2009 | Diab | H04L 12/40 725/75 |
| 2009/0292796 | A1 | 11/2009 | Huang | |
| 2010/0121946 | A1 | 5/2010 | Claes et al. | |
| 2010/0273423 | A1 * | 10/2010 | Boyer | G01C 21/3655 455/41.2 |
| 2010/0295670 | A1 * | 11/2010 | Sato | B60Q 9/00 340/458 |
| 2011/0002260 | A1 * | 1/2011 | Kim | H04H 20/61 370/328 |
| 2013/0265950 | A1 * | 10/2013 | Kim | H04H 20/61 370/329 |
| 2016/0087935 | A1 * | 3/2016 | Kim | H04H 20/61 370/329 |

FOREIGN PATENT DOCUMENTS

| | | | |
|---|---|---|---|
| KR | 10-2006-0037721 | A | 3/2005 |
| KR | 10-2007-0044701 | A | 4/2007 |
| KR | 10-2007-0047592 | A | 5/2007 |
| KR | 10-2007-0053907 | A | 5/2007 |
| KR | 10-2007-0095237 | A | 9/2007 |
| WO | WO 2009/088151 | A1 | 7/2009 |

* cited by examiner

PRIVATE MULTIMEDIA CONTENTS BROADCASTING EQUIPMENT WHICH USES ISM RADIO FREQUENCY BAND OR U-NII 5GHZ RADIO FREQUENCY BAND, PRIVATE MULTIMEDIA CONTENTS BROADCASTING SYSTEM AND METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*More than one reissue application has been filed for the reissue of U.S. Pat. No. 10,164,935. The reissue applications are: (1) the present application; and (2) U.S. patent application Ser. No. 17/021,314, filed on Sep. 15, 2020, based on which the present application is filed.*

This application is *a continuation reissue application of U.S. patent application Ser. No. 17/021,314, which is a reissue application of U.S. Pat. No. 10,164,935 issued on Dec. 25, 2018 from U.S. patent application Ser. No. 14/955,767 filed on Dec. 1, 2015, which is* a continuation of U.S. patent application Ser. No. 13/837,808 filed on Mar. 15, 2013, now U.S. Pat. No. 9,210,123 issued on Dec. 8, 2015, which is a continuation of U.S. patent application Ser. No. 12/446,768 having a 371(c) date of Apr. 23, 2009, now U.S. Pat. No. 8,660,116 issued on Feb. 25, 2014, which is a U.S. national stage application of International Application No. PCT/KR2008/005768 filed on Oct. 1, 2008, which claims the benefit of Korean Patent Application Nos. 10-2008-0001509 filed on Jan. 5, 2008, and 10-2008-0091660 filed on Sep. 18, 2008, in the Korean Intellectual Property Office, the entire disclosures of which are incorporated herein by reference for all purposes.

TECHNICAL FIELD

The present invention relates to a personal multimedia contents broadcasting equipment and a method thereof which provide functions for to broadcasting multimedia contents such as a text data, a symbol data, a music data, a sound data, an audio data, a video data, an image data, a photo data or something, with their intellectual properties belonging to individuals, respectively, to a specific receiving terminal by using an ISM radio frequency band or a U-NII 5 GHz radio frequency band.

CITED REFERENCES

1. RFC2131 Dynamic Host Configuration Protocol, 1997. 3.
2. RFC3442 The classless Static Route Option for Dynamic Host Configuration Protocol (DHCP) version 4, 2002. 12.
3. RFC4280 Dynamic Host Configuration Protocol (DHCP) Options for Broadcast and Multicat Control Services 2005. 11.
4. RFC1918 Address Allocation for Private Internets, 1996. 2.
5. RFC3580 IEEE802.1x Remote Authentication Dial In User Service (Radius) Usage Guidelines, 2003. 9.

6. UO 2003-22652 (Honeywell Federal Manufacturing & Technologies, LLC), 2003 Jan. 30
7. Regulation improvement ways for Domestic ISM Industry Promotion [On-line], 2007. 4. ETRI. Trend analysis of Electronic and communication, 22-2nd book (Searched date: Nov. 6, 2007)
8. Introduction to ActiveX Controls [on-line], 2007. (Searched date: Nov. 6, 2007)
9. Windows media player [on-line], 2007. (Searched date: Nov. 6, 2007)

BACKGROUND ART

Generally, a conventional multimedia contents broadcast is equipped with a radio communication network for broadcasting multimedia contents whose intellectual properties belong to individuals, and uses a system of a service provider who provides an individual multimedia contents broadcasting service based on the above radio communication network.

In more details, an individual multimedia contents broadcast might be performed by using a system belonging to a service provider which is equipped with a DHCP server which allocates a public IP to an individual user for a connection with a service provider's network based on a radio communication network after an individual broadcast radio frequency band is reported to a public organ, which controls and manages a radio communication, and receives an authentication from the same; an authentication server which manages the processes that an individual user connects to a multimedia contents DB server which is set by the service provider; a multimedia contents DB server of the service provider which stores an original version multimedia contents or edited multimedia contents whose intellectual properties belong to individual users; and a playback tool storing server which provides playback tools so that a certain user can playback a corresponding multimedia contents stored in the multimedia contents DB server of the service provider.

However, it is disadvantageous that an individual multimedia contents broadcast using a service provider's system should use a radio frequency band authenticated by a public organ which controls and manages a radio communication, and an individual user should pay a service charge for the use of a radio communication network and should further pay a service charge for the use of a public IP used for a connection with the service provider's system. In addition, the individual users should all request services on the use of a service provider's system so as to use a multimedia contents DB server of the service provider. The individual users are needed to have individual user's authentications from the service providers all the time whenever connecting to the service provider's system. The individual users should use the above system even though they feel a lot of inconvenience in the use of the above systems. In worse case, it is needed to assign the intellectual properties of the multimedia contents belonging to the individual users to the service provider.

DISCLOSURE OF INVENTION

Accordingly, it is an object of the present invention to provide private multimedia contents broadcasting equipment which uses an ISM radio frequency band or U-NII 5 GHz radio frequency band, a private multimedia contents broadcasting system and method thereof which overcomes the problems encountered in the conventional art.

To achieve the above objects, an individual multimedia contents broadcasting equipment which comprises an individual broadcast process unit which provides a private IP through a DHCP to a receiving terminal, which requests a connection, and makes a connection of the receiving terminal through a radio network, and transmits a broadcast content to the connected receiving terminal; and a radio communication unit which forms a radio network and communicates data with the connected receiving terminal through the radio network. The individual multimedia contents broadcasting equipment includes an input unit which has at least one among an operation unit, a microphone and a camera for producing multimedia contents; and an output unit which has a display unit and a speaker for playing back the broadcasting is multimedia contents, and the individual broadcasting process unit creates and stores a broadcast content using a data inputted through the input unit depending on a broadcaster's operation and outputs the multimedia contents stored or received depending on the broadcaster's operation through the output unit.

The radio network uses either an ISM (Industrial Science and Medical) radio frequency band or a U-NII 5 GHz radio frequency band.

The individual broadcasting process unit includes a broadcast module which creates and stores a broadcast content using a data inputted through the input unit and provides a temporal IP to the receiving terminal, which requests a connection, and makes a connection of the receiving terminal through a radio network, and transmits a broadcast content to the connected receiving terminal; a storing device which stores an individual broadcast multimedia content created by the broadcast module; and a controller which controls the broadcast module, the storing device, the input unit, the output unit and the radio communication unit in accordance with a control signal inputted through the input unit for thereby performing an individual multimedia content broadcast.

The individual multimedia contents broadcasting equipment transmits one content among an individual broadcasting multimedia content created in real time from the content creation module depending on a broadcaster's operation, an individual broadcast multimedia content stored in the storing device, an individual broadcast multimedia content which is created in real time, and a content which is combined with the individual multimedia contents stored in the storing device.

The broadcast module includes an input and output module for controlling a data input through the input unit and a data output through the output unit; an individual broadcast process module which creates a multimedia content in real time by using a data inputted through the input unit, and allocates a private IP through a DHCP function to the receiving terminal which requests a connection, and sets a connection, and retrieves the provided private IP and disconnects the connection; and a radio communication module which broadcasts an individual broadcast multimedia content based on the broadcaster's operation to the connected receiving terminal by controlling the radio communication unit.

The individual broadcast process module includes a content creation module which creates a multimedia content in real time by using a data inputted through the input unit; a DHCP module which allocates a private IP through a DHCP function to a receiving terminal which requests a connection, and sets a connection, and retrieves the allocated private IP and disconnects the connection; and a private IP management module which stores and manages the private IP information which might be allocated to the receiving terminal and the allocated private IP information.

The individual broadcast module includes a playback tool management module which automatically install a multimedia content playback tool when the connected receiving terminal does not have a content playback tool for thereby playing back the multimedia contents; an authentication module which performs an authentication by using information from the connected receiving terminal and permits a receipt when the authentication is allowed, and when the authentication is failed, it retrieves the allocated private IP and disconnects the connection; and a connection terminal management module which monitors in real time connection information including at least one between the number of connected receiving terminals and a connection state and indicates the current connection information through the output means periodically.

The individual multimedia content broadcasting equipment forms an independent network for an individual broadcast using a private IP through the DHCP function.

The individual multimedia content broadcasting equipment receives an allocation of the private IP of another individual multimedia content broadcasting equipment for thereby receiving broadcast, and the individual multimedia content broadcasting equipment is capable of performing a relay broadcast which requests a receipt of the multimedia contents received from another individual multimedia content broadcasting equipment.

The individual multimedia content broadcasting equipment has an expandable independent network for an individual broadcast through a relay broadcast function.

The individual multimedia content broadcasting equipment is a fixed broadcast device or a mobile broadcast device.

To achieve the above objects, in an individual multimedia content broadcasting system which includes a receiving terminal, a radio network, and an individual multimedia content broadcasting equipment, there is provided an individual multimedia content broadcasting system which comprises a receiving terminal which requests a connection to an individual multimedia content broadcasting equipment through a radio network depending on a viewer's request, and receives an allocation of a private IP, and is connected, and receives a broadcasting content from the individual multimedia content broadcasting equipment and plays back the same; and an individual multimedia content broadcasting equipment which creates and stores a broadcast multimedia content depending on a broadcaster's operation, and allocates a private IP depending on a connection request of the receiving terminal, and forms the radio network, and transmits the broadcast multimedia contents to the receiving terminal depending on the broadcaster's operation.

The radio network uses either an ISM radio frequency band or a U-NII 5 GHz radio frequency band.

The radio network is an independent network for an individual broadcast by using a private IP through a DHCP function of the individual multimedia content broadcasting equipment.

The individual multimedia content broadcasting system further includes an individual multimedia content broadcasting relay equipment which receives an allocation of the private IP from the individual multimedia content broadcasting equipment and receives an individual broadcast and relays an individual broadcast depending on a request of the receiving terminal in a region of the relay radio network which requests the received individual broadcast view.

To achieve the above objects, in an individual multimedia content broadcasting method which includes a radio network, a receiving terminal and an individual multimedia content broadcasting equipment, there is provided an individual multimedia content broadcasting method which comprises (a) a step in which a broadcast multimedia content is selected by means of a broadcaster's operation; (b) a step in which a connection request is received from a receiving terminal in a region of the radio network; (c) a step in which a private IP is provided to a receiving terminal, which requested a connection, for thereby forming and connecting an individual broadcasting independent radio network; (d) a step in which when an authentication step is set, an authentication of a receiving terminal is performed by receiving an authentication information from the receiving terminal; (e) a step in which when an authentication is failed, the private IP is retrieved, and the connection is disconnected, and when an authentication is succeeded, it is judged whether a playback tool is installed or not in the receiving terminal, and when it not installed, the playback tool is installed; and (f) a step in which a broadcast multimedia content selected by the broadcaster in the step (a) is transmitted.

To achieve the above objects, in an individual multimedia content broadcasting method which includes a radio network, a receiving terminal, an individual multimedia content broadcasting equipment, and an individual multimedia content broadcasting relay equipment, there is provided an individual multimedia content broadcasting method which comprises (1) a step in which an individual multimedia content broadcasting equipment selects a broadcasting multimedia content depending on a broadcaster's operation; (2) a step in which an individual multimedia content broadcasting equipment receives a connection request from the individual multimedia content broadcasting relay equipment in a radio network region; (3) a step in which an individual multimedia content broadcasting equipment provides a private IP to the individual multimedia content broadcasting relay equipment which requested a connection for thereby forming an individual broadcasting independent radio network; (4) a step in which an individual multimedia content broadcasting equipment transmits a broadcasting multimedia content to the individual multimedia content broadcasting relay equipment; (5) a step in which an individual multimedia content broadcasting relay equipment receives a connection from a receiving terminal in a region of a relay radio network; (6) a step in which an individual multimedia content broadcasting relay equipment provides a private IP to a receiving terminal which requests a connection for thereby forming a relay broadcasting independent radio network; (7) a step in which when an authentication function is set, an individual multimedia content broadcasting relay equipment receives an authentication information from the receiving terminal for thereby performing an authentication of the receiving terminal; (8) a step in which when an individual multimedia content broadcasting relay equipment fails an authentication, the private IP is retrieved, and the connection is disconnected, and when the authentication is succeeded, it is judged whether a playback tool is installed or not in the receiving terminal, and when the tool is not installed, the tool is installed; and (9) a step in which an individual multimedia content broadcasting relay equipment transmits a broadcast multimedia content received in the step (4).

Effects

In the present invention, since it is possible to broadcast individual multimedia contents whose intellectual properties belong to individuals by using an ISM radio frequency band or a U-NII 5 GHz radio frequency band which can be used for free by individuals for a radio communication within a shorter distance in a specific region or a building in a range which does not interfere with the communications of other radio stations for thereby providing individual users with an economical advantage for the use of a free radio frequency. Since a private IP is used for setting a connection to a receiving terminal, an economical advantage can be also obtained as compared to the use of a public IP. Since an authentication function is operational, a connection to a receiving terminal can be controlled by an individual. When there is not a multimedia contents playback tool in a receiving terminal which requests a connection, a playback tool can be automatically installed, and a connection state of a connected receiving terminal can be checked in real time for an efficient management.

In addition, the present invention allows an individual user to easily set an individual multimedia contents broadcast.

BEST MODE FOR CARRYING OUT THE INVENTION

Figure 1:
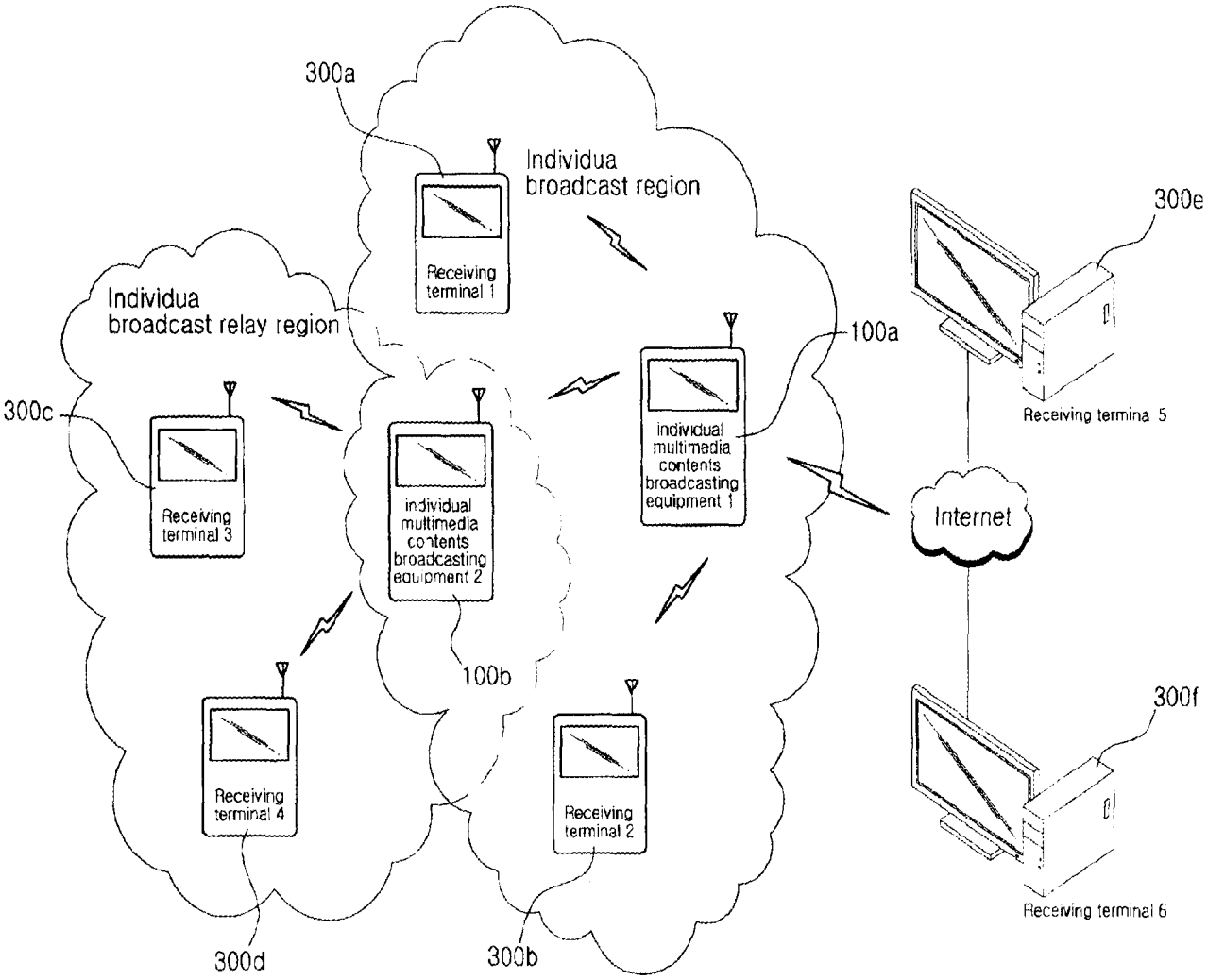
FIG. 1 is a schematic view of an individual multimedia contents broadcasting system according to an embodiment of the present invention.

FIG. 1 is a schematic view of an individual multimedia contents broadcast system according to a preferred embodiment of the present invention. As shown in FIG. 1, an individual multimedia contents broadcast system according to the present invention comprises a receiving terminal 300, a radio network, and an individual multimedia contents broadcasting equipment 100a.

The receiving terminal 300 is connected to an individual multimedia contents broadcasting equipment 100a as it requests a connection to an individual multimedia contents broadcasting equipment 100a through a radio network formed by means of an individual multimedia contents broadcasting is equipment 100a depending on a user's operation and receives a private IP.

The receiving terminal 300 is capable of receiving and playing back the broadcast contents from the individual multimedia contents broadcasting equipment 100a.

The receiving terminal 300 might be a mobile communication terminal having an input unit such as an operation unit 104a, an output unit such as a speaker 104d and a LCD 104e, and a radio communication unit 102 for a data receiving and transmission through the radio network or might be a portable individual information communication instrument such as a PDA, a palm top computer, a UMPC, a navigation device, a portable game unit or the like. Here, the radio network according to the present invention is constructed to perform a radio data communication based on the IEEE 802.11 protocol. So, there is provided a radio communication unit 102 which supports a data communication based on the IEEE 802.11 protocol. The radio network according to the present invention might be configured to use various universal radio data communication protocols except for the IEEE 802.11 if necessary. The construction and functions of the receiving terminal 300 will be described later with reference to FIG. 3.

The individual multimedia contents broadcasting equipment 100a lo creates and stores broadcast multimedia contents depending on a broadcaster's operation and allocates a private IP depending on a connection request of the receiving terminal 300 and forms a radio network and transmits a broadcast multimedia content selected by means of a broadcaster's operation. The individual multimedia contents broadcasting equipment 100a might be equipped with an input unit such as an operation unit 104a, a microphone 104b, a camera 104c or something, an output unit such as a speaker 104d, a LCD 104e or something, a mobile communication terminal having a radio communication unit 102 for a data receiving and transmission through a radio network, and an individual information communication instrument such as a PDA, a palm top computer, a UMPC, a navigation device, a portable game unit or something. The functions and constructions of the individual multimedia contents broadcast equipment 100a will be described with reference to FIGS. 2A and 2B.

Here, the radio network created and maintained by means of the individual multimedia contents broadcasting equipment 100a is designed to use an ISM (Industrial, Science and Medical) radio frequency band or a U-NII 5 GHz radio frequency band. The ISM radio frequency band is a frequency band allocated by the FCC for the use in industry, a science and a medical field. 902.about.928 MHz, 2.4 G.about.2.4835 GHz and 5.725 GHz.about.5.835 GHz frequency bands are set for the ISM bands. These frequency bands are not needed to have ant permission for a frequency allocation. The output of the equipment which uses the above frequency bands is 17 dBm/50 mW. The U-NII 5 GHz radio frequency band is a frequency band used in the IEEE 802.11a and HIPERLAN/2 which also does not need any permission for a frequency Lo allocation.

In the present invention, 802.11a, 802.11b or 802.11g might be used or properly combined for a LAN radio communication. The 802.11a, 802.11b and 802.11g are the protocols for a radio LAN developed by the IEEE work group. The above three protocols use CSMA/CA which is an Ethernet protocol. The 802.11b provides a rate of 11 Mbps per second, whereas the latest 802.11g provides a relatively shorter distance communication at a rate of 54 Mbps in maximum. Since the 802.11g works in a 2.4 GHz band like 802.11b, there is compatibility between the above two protocols. The modulation method used in 802.11 is traditionally PSK, but the modulation applied in 802.11b provides a faster data transmission rate, and uses CCK which is not interfered with multiplexed transmission passages. The 802.11a is generally used in a radio ATM system, namely in an access hub. The 802.11a is applied in a radio frequency bandwidth of 5 GHz-6 GHz. The 802.11a uses a modulation method which is called an OFDM for a data transmission rate up to 54 Mbps in maximum.

In case of 5 GHz band, since it is a relatively higher frequency, it is not proper that other small compact sized radio devices might compete with one another for frequencies. The IEEE 802.11a has much less interferences by means of other devices as compared to the IEEE 802.11b and advantageously supports a faster transmission rate of 54 Mbps. It is preferred that the radio network according to the present invention is configured in an independent network for a personal broadcasting service provided using a private IP through a DHCP function of the individual multimedia contents broadcasting equipment 100a.

It is disadvantageous that the IEEE 802.11a, IEEE 802.11b, and IEEE 802.11g might be used only for the LAN radio communication. So as to overcome the above disadvantages, the individual multimedia contents broadcasting equipment according to the present invention might be further equipped with an individual multimedia contents relay broadcasting equipment 100b. The individual multimedia contents relay broadcasting equipment 100b is configured in the same manner as the individual multimedia contents broadcasting equipment 100a. A private IP is allocated from the individual multimedia contents broadcasting equipment 100a in a radio communication radius of the individual multimedia contents broadcasting equipment 100a, and the individual broadcast received depending on a request of the receiving terminal 300c in a relay radio network range, which requests a received individual broadcast viewing, is relayed. Namely, the individual multimedia contents broadcasting system according to the present invention can overcome the problems of the radio data communication radius by using the individual multimedia contents relay broadcasting equipment 100b, so it is possible to watch an individual broadcast from a relatively farther distance.

Figure 2A:
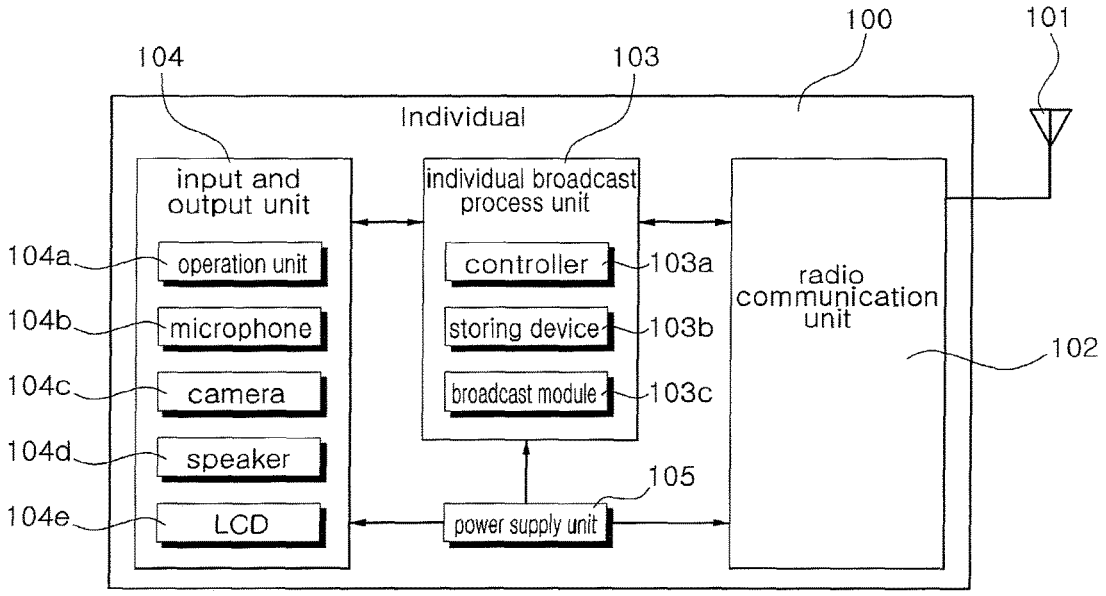
FIG. 2A is a block diagram of a physical internal construction of an individual multimedia contents broadcasting equipment in an individual multimedia contents broadcasting which uses an ISM radio frequency band or a frequency band according to an embodiment of the present invention.

FIG. 2A is a block diagram of a physical internal construction of an individual multimedia contents broadcasting equipment in an individual multimedia contents broadcasting which uses an ISM radio frequency band or a U-NII 5 GHz radio frequency band.

As shown in FIG. 2A, the individual multimedia contents broadcasting equipment 100a according to the present invention comprises an input and output unit 104, an individual broadcast process unit 103, a radio communication unit 102, an antenna 101, and a power supply unit 105.

The input and output unit 104 includes an input part and an output part. The input part is formed of at least one among an operation unit 104a for receiving a control signal based on a broadcaster's operation, a microphone 104b for receiving a sound data, and a camera 104c for receiving a video data. The output part is formed of at least one between a speaker 104d for is outputting a sound data, a LCD 104e for outputting a video data and something. Here, the operation unit 104a represents an input device such as a keypad, a keyboard, a mouse, a touch screen or something. The microphone 104b and the camera 104c might be formed of a microphone 104b and a camera 104c provided in the individual multimedia contents broadcasting equipment 100a or might be formed of an external microphone 104b and a camera 104c connected through an interface part such as a USB port. The input and output unit 104 is configured by using a known art. So, the detailed descriptions of the same will be omitted.

The individual broadcast process unit 103 creates and stores broadcast contents using a data inputted through an input unit and provides a receiving terminal, which requests a connection, with a private IP for thereby connecting through a radio network and transmits broadcast contents to the receiving terminal connected. More preferably, the individual broadcast process unit 103 according to the present invention includes a broadcast module 103c, a storing device 103b and a controller 103a.

The broadcast module 103c creates and stores broadcast contents using a data inputted through an input unit depending on a broadcaster's operation and provides a private IP to the receiving terminal 300 which requests a connection for thereby connecting through a radio network and transmits an individual multimedia content to the connected receiving terminal 300 based on a broadcaster's selection. At this time, the individual broadcasting multimedia contents broadcasted through the receiving terminal 300 according to the present invention might be a text data, a symbol data, a music data inputted through the microphone 104b, a sound data, an audio data, a video data inputted through the camera 104c, an image data, a photo data or a combination of the same.

The individual broadcasting multimedia contents according to the present invention might be an individual broadcasting multimedia content created in real time from the broadcasting module 103c depending on a broadcaster's operation, an individual broadcasting multimedia content stored in the storing device 103b, an individual broadcasting multimedia content created in real time, an individual broadcasting multimedia content stored in the storing device 103b or a combination of the same and might be transmitted. When a broadcaster selects a real time broadcast by operating the individual multimedia contents broadcasting equipment 100a, the individual multimedia contents broadcasting equipment 100a according to the present invention creates an individual broadcasting multimedia content using a sound data, an audio data, a text data and a video data inputted in real time from the input unit, and transmits in real time to the receiving terminal 300. When the broadcaster selects a recording broadcast, the individual broadcasting multimedia content previously created and stored in the storing device 103b is transmitted to the receiving terminal 300. When the broadcaster selects a combined content (for example, when a specific content previously created and stored in the storing device 103b is selected as a background image, and when it is combined with a motion image inputted in real time on the background image and it is broadcasted), the contents combined with the individual broadcasting multimedia contents created in real time and the individual broadcasting multimedia contents stored in the storing device 103b are transmitted to the receiving terminal 300.

The storing device 103b includes various programs used for driving the individual multimedia contents broadcasting equipment 100b and stores an individual broadcasting multimedia content created from the broadcasting module 103c depending on a broadcaster's selection. The storing device 103b might be formed of various universal storing devices such as a hard disk drive, a ram disk drive or something.

The controller 103a controls a broadcast module 103c, a storing device 103b, an input and output unit 104 and a radio communication unit 102 depending on a control signal inputted through the operation unit 104a, and creates an individual broadcasting multimedia content and performs an individual multimedia contents broadcasting.

The radio communication unit 102 forms a radio network and performs a data communication with the receiving terminal 300 connected through a radio network and is configured to substantially support the IEEE 802.11a, IEEE 802.11b, IEEE 802.11g, IEEE 802.11n which are selected depending on the needs in the individual multimedia contents broadcasting system according to the present invention.

Figure 2B:
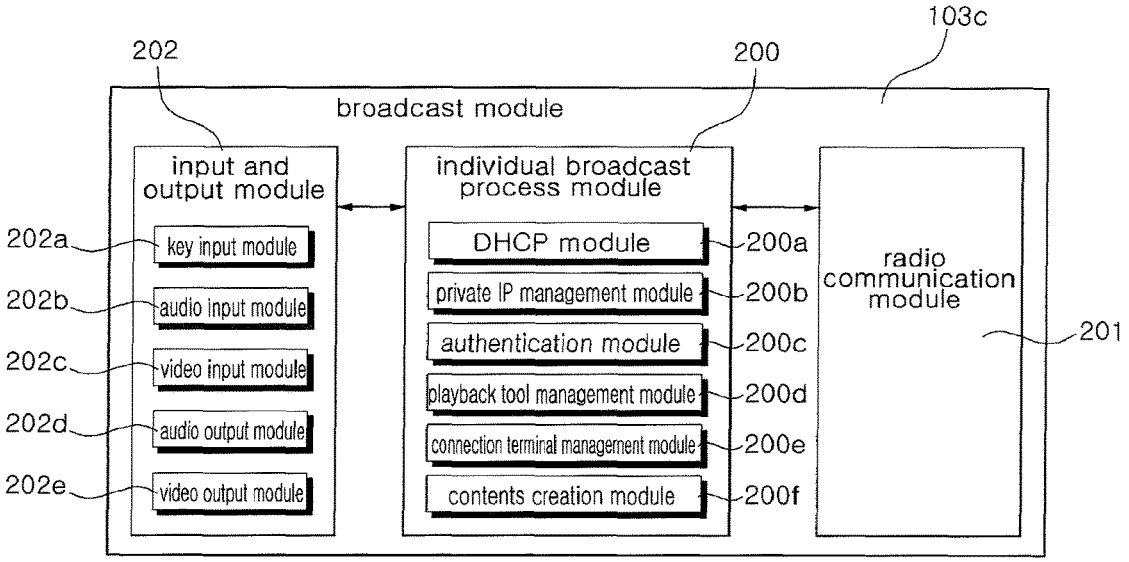
FIG. 2B is a block diagram of a logical internal construction of an individual multimedia contents broadcasting equipment in an individual multimedia contents broadcasting which uses an ISM radio frequency band or a U-NII 5 GHz radio frequency band according to an embodiment of the present invention.

As shown in FIG. 2B, the broadcast module 103c according to the present invention comprises an input and output module 202, an individual to broadcast process module 200, and a radio communication module 201. The input and output module 202 is a device drive of an input and output unit and controls a data input through the input unit and a data output through the output unit, and the radio communication module 201 is a device drive of the radio communication unit 102 and controls the radio communication unit 102 and broadcasts the individual broadcasting multimedia contents on the receiving terminal 300 depending on the broadcaster's operation.

The individual broadcast process module 200 is a key module for performing an individual multimedia contents broadcasting according to the present invention and creates and stores a multimedia content using the data inputted from the input unit and allocates a private IP through a DHCP (Dynamic Host Configuration Protocol) to the receiving terminal which requested a connection and sets a connection or retrieves the provided private IP and disconnects the connection and transmits an individual broadcasting multimedia content to the connected receiving terminal 300 based on the broadcaster's selection. So as to perform the above operations, the individual broadcast process module 200 comprises a DHCP module 200a, a private IP management module 200b, an authentication module 200c, a playback tool management module 200d, a connection terminal management module 200e, and a content creation module 200f.

The content creation module 200f creates a text data and a symbol data inputted through the individual broadcasting multimedia content operation unit 104a using a data inputted through the input unit, a music data, a sound data and an audio data inputted through the microphone 104b, and a video data, an to image data and a photo data inputted through the camera 104c and combines the same. So as to perform the above operations, the content creation module 200f according to the present invention is configured to support a text/symbol input function, a music/sound encoding function, a photo/motion picture encoding function or something. It further supports a combining and encoding function for a mixed content creation. Here, the encoding codes might be selected from mp3, wma, jpg, asp, mpeg, xvid or something. An exclusive codec might be used.

The DHCP module 200a allocates a private IP through a DHCP function to the receiving terminal 300 connected, and sets a connection or retrieves the allocated private IP and disconnects the connection. Namely, the DHCP module 200a according to the present invention performs a DHCP server function and sets a private IP in the receiving terminal 300, which requested a connection in an individual broadcasting independent radio network, by using a private IP information stored in the private IP management module, so the individual broadcasting independent radio network might be configured, and the individual broadcasting might be watched.

The private IP management module 200b stores and manages a private IP information to be allocated to the receiving terminal 300, and a private IP information allocated to the current receiving terminal 300. The private IP information created and stored by the private IP management module 200b is referred by means of the DHCP module 200a, so a private IP to be allocated to the receiving terminal 300 is determined. When the private IP is allocated to the receiving terminal 300 or is retrieved, and the connection is disconnected, the above operation is updated in real time.

The playback tool management module 200d judges whether the content playback tool is installed or not in the connected receiving terminal 300. When it is not installed, the multimedia content playback tool stored in the storing device 103b is transmitted to the receiving terminal 300 and is automatically installed, so the multimedia contents can be played back. At this time, the multimedia content playback tool installed in the receiving terminal 300 is configured to decode the encoded multimedia data depending on the adapted encoding codec or a codec previously installed in the receiving terminal 300 might be used or a certain codec might be previously installed in the multimedia content playback tool.

When the broadcaster selects an authentication function, the authentication module 200c performs an authentication using terminal information, so that only the authenticated receiving terminal 300 can view an individual broadcast. So as to perform the above operations, the authentication module receives registration information from a new terminal (or user) who wants to view the individual broadcast, and creates an authentication information and stores in the storing device 103b, for thereby finishing a new registration. The authentication information stored in the storing device 103b is compared with the authentication information (terminal information or user information) received from the connected receiving terminal, so a needed authentication is performed. As a result, when the authentication is succeeded, the content receipt of the receiving terminal 300 is permitted, and when the authentication is failed, the private IP provided to the receiving terminal 300 is retrieved, and the connection is finished.

The connection terminal management module 200e monitors in real time connection information including at least one among the number of connected receiving terminals, a connection state, a radio communication sensitivity or something and displays the current connection information on the LCD 104e temporarily or periodically depending on the previously set information and provides to the broadcaster in real time. The real time connection information monitored by means of the connection terminal management module 200e is stored in the storing device 103b in a DB form. The connection terminal management module 200e extracts and provides connection information stored in the database when the broadcaster requests a connection data such as connection information of a certain time period or a specific time section or provides the broadcaster with a statistic data.

The individual multimedia contents broadcasting equipment 100b according to the present invention receives an allocation of the private IP from other individual multimedia contents broadcasting equipments 100a for thereby receiving the contents broadcasted by means of another individual multimedia contents broadcasting equipment 100a. So, the individual multimedia contents broadcasting equipment 100b according to the present invention performs a relay broadcast in a relay region where requests a receipt of the multimedia contents received from another individual multimedia contents broadcasting equipment 100a. The individual multimedia contents broadcasting equipment 100b having a relay function is formed in the same construction as the individual multimedia contents broadcasting equipment 100a which performs the above broadcasting functions, provided that there are differences only in the contents received from the individual multimedia contents broadcasting equipment 100a. So, the construction and operations of the same will be omitted. The above relay function is provided for overcoming the limits in the LAN radio communication radius. When the relay function is used, an expansion of the independent radio network for an individual broadcast might be possible. The relay function will be described later with reference to FIGS. 5 and 6.

The individual multimedia contents broadcasting equipment 100a according to the present invention might be configured in fixed broadcast equipment or portable broadcast equipment. In case of the fixed type, an individual information communication instrument such as a desk top system except for a portable or mobile communication instrument might be used. In case of the portable type, a portable individual information communication instrument such as a mobile communication terminal, a PDA, a palm top computer, a UMPC, a navigation device, a portable game unit or something might be used. The individual multimedia contents broadcasting equipment 100b having a relay function might be a mobile system while maintaining a radio communication radius which is a relatively shorter distance as compared to the fixed type.

Figure 3:
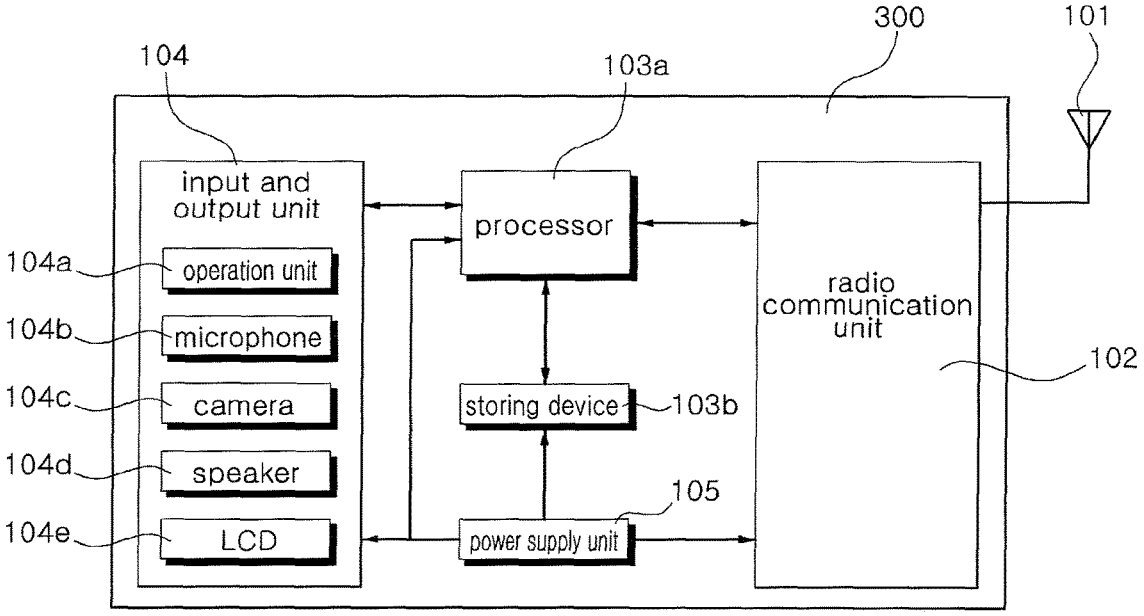
FIG. 3 is a block diagram of an inner construction of a receiving terminal which is capable of receiving an individual broadcast in an individual multimedia contents broadcasting which uses an ISM radio frequency band or a U-NII 5 GHz radio frequency band according to an embodiment of the present invention.

FIG. 3 is a block diagram of an inner construction of a receiving terminal which is capable of receiving individual multimedia contents broadcasting which uses an ISM radio frequency band or a U-NII 5 GHz radio frequency band.

As shown in FIG. 3, the receiving terminal 300 according to the present invention comprises an antenna 10a, a radio communication unit 102, a processor 103a, a storing device 103b, an input and output unit 104, and a power supply unit 105. The above elements are key parts in the individual information communication instrument and operate in the same manner as the elements of the individual multimedia contents broadcasting equipment 100a. So, the detailed descriptions of the same will be omitted. The receiving terminal 300 according to the present invention is equipped with a multimedia contents playback tool (not shown) which is used for playing back the contents from the individual multimedia contents broadcasting equipment 100a. When the logically operable broadcast module 103c is integrally provided in the system, not being independent from the contents playback tool, and is installed in the receiving terminal 300, the receiving terminal 300 receives broadcast contents from the other receiving terminal (individual multimedia contents broadcasting equipment 100a) and plays back the same. When the user wants, the user can perform own individual broadcast using the broadcast module 103c. When the broadcast module 103c and the contents playback tools are separately installed, it is needed to install both the broadcast module 103c and the contents playback tool for each corresponding function.

Figure 4:
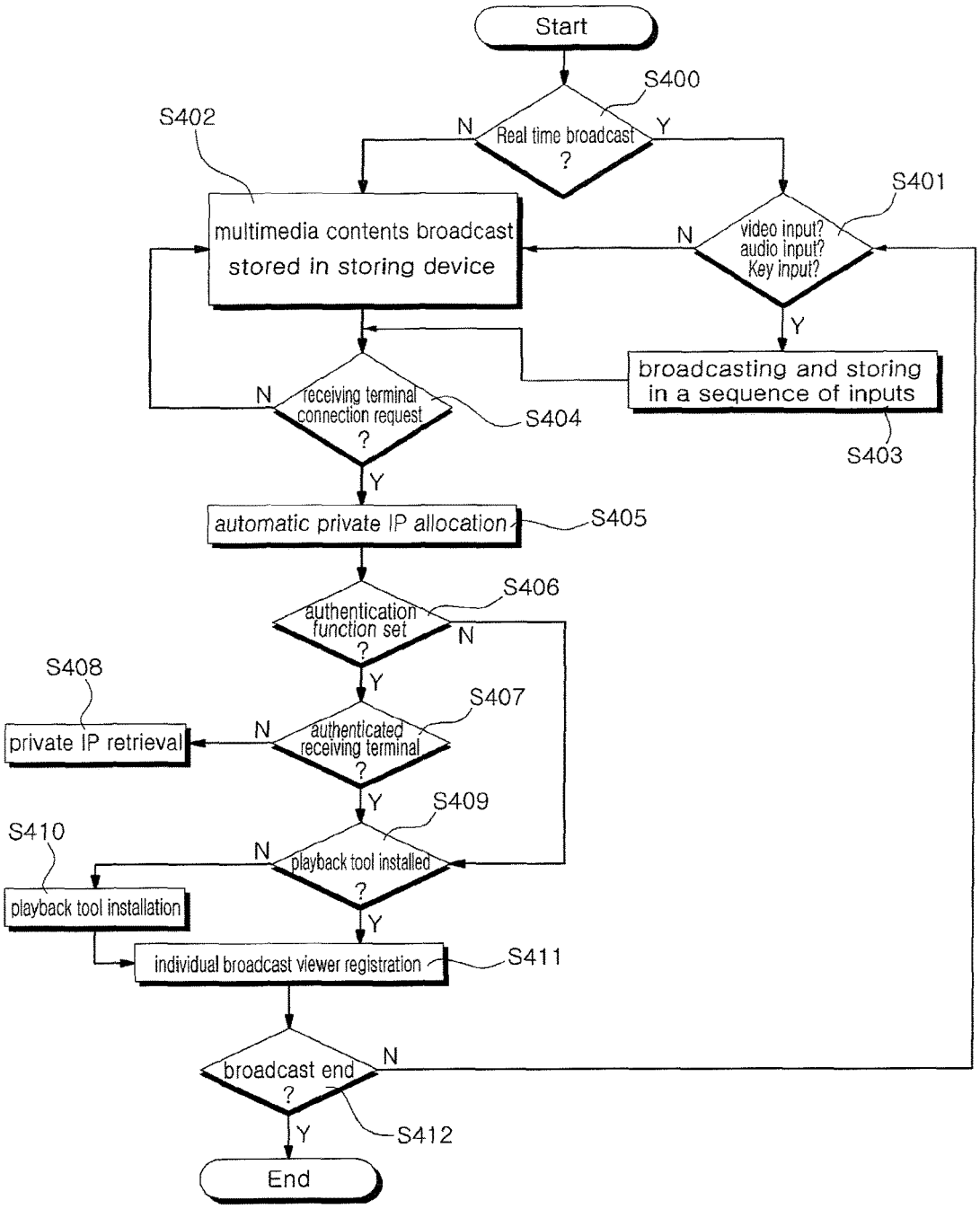
FIG. 4 is a flow chart of an individual broadcast procedure of an individual multimedia contents broadcasting equipment in an individual multimedia contents broadcasting which uses an ISM radio frequency band or a U-NII 5 GHz radio frequency band according to an embodiment of the present invention.

FIG. 4 is a flow chart of an individual broadcast procedure of the individual multimedia contents broadcasting equipment in the individual multimedia contents broadcasting which uses an ISM radio frequency band and a U-NII 5 GHz radio frequency band according to the present invention. The individual broadcast manufacturing method according to the present invention will be described with reference to FIG. 4.

An individual broadcast driving instruction inputted through the operation unit 104a depending on a broadcaster's operation is interpreted by means of a key input module 202a, and is transmitted to the controller 103a. The controller 103a judges whether the multimedia contents stored in the storing device 103b are broadcasted or the multimedia contents inputted through the input and output unit 104 are broadcasted in real time in a step S400.

In case that the individual broadcast driving instruction corresponds to a recording broadcast in which the multimedia contents stored in the storing device 103b are broadcasted, the controller 103a transmits the multimedia contents stored in the storing device 103b to the radio communication instrument 102, and a corresponding broadcast beings in a step S402.

When the broadcaster selects a real time broadcast, the text data and symbol data inputted trough the operation unit 104a are interpreted by means of the key input module 202a, and the music data, audio data and sound data inputted through the microphone 104a are interpreted by means of the audio input module 202b, and the image data, image data, and photo data inputted through the camera 104c are interpreted by means of the video input module 202c. The above data are sequentially transferred to the controller 103a in a step S401. The controller 103a creates multimedia contents in real time in a sequence of the input, and stores into the storing device 103b, and transmits the multimedia contents created in real time through the radio communication unit 102, and the broadcast begins.

In the steps S402 and S403, the multimedia contents, which are individually broadcasted, are outputted to the speaker 104d by the process of the controller 103a, and the music data, audio data and sound data are outputted to the speaker 104d through the audio output module 202d. The video data, image data, and photo data are outputted to the LCD 104e through the video output module 202e. The broadcaster performs a broadcast while checking the contents of the multimedia contents which are being broadcasted through the output unit of the individual multimedia contents broadcasting equipment 100a.

In the step S401, when the multimedia contents stored in the storing device 103b with a periodically repeated judgment process after the individual broadcast has begun are broadcasted, the multimedia contents inputted through the input and output device 104 are combined with the multimedia contents of the storing device 103b depending on the process of the processor 103a as a result of the judgment of the step S401 and are broadcasted.

Next, the controller 103a judges a connection request of the receiving terminal 300. When there is a request, a private IP allocable to the receiving terminal 300 which requested a connection with reference to the current private IP information managed by means of the private IP management module 200b through the DHCP module 200a is selected and automatically allocated to the receiving terminal for thereby setting a connection in steps S404 and S405.

When an authentication function is not activated after a connection is set, the authentication module 200c receives authentication information from the connected receiving terminal 300 and compares with the authentication information stored in the storing device 103b for thereby judging whether the connected receiving terminal is the receiving terminal 300 registered in the connection terminal management module 200e in steps S406 and S407.

As a result of the judgment of the registration, when the connected receiving terminal is not the authenticated receiving terminal 300, the allocated private IP is retrieved, and the connection is automatically disconnected, and the broadcast receipt is prohibited in a step S408, and in case of the authenticated receiving terminal, the step S409 is performed.

Next, the controller 103a judges whether there is a playback tool in the authenticated receiving terminal 300 for playing back the broadcast contents with the helps of the playback module 200d in a step S409, and when a playback tool is not installed, the playback tool stored in the storing device 103b is transmitted to the receiving terminal 300 using the playback tool module 200d and is installed in a step S410. When an individual content can be played back in the receiving terminal 300, the controller 103a transmits a currently broadcasting content selected by the broadcaster to the receiving terminal 300, and the receiving terminal 300 receives the broadcast content and plays back the same. At this time, the connection terminal management module 200e of the individual multimedia contents broadcasting equipment 100 periodically transmits a connection state of the receiving terminal 300 to the video output module 202e, and the video output module 202e indicates the connection state of the receiving terminal 300 on the LCD 104e and periodically manages the same.

When the individual broadcast is continuously performed, the routine is repeated from the step S401 to the step S412. When it is judged that the individual broadcast is finished, the individual broadcast operation is stopped in a step S412.

Figure 5:
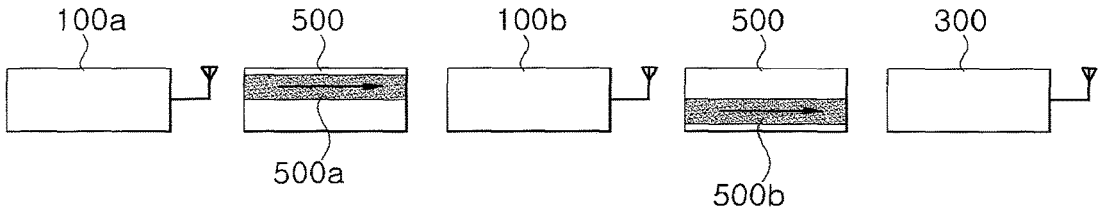
FIG. 5 is a view of a relay broadcast method of an individual multimedia contents broadcasting equipment in an individual multimedia contents broadcasting which uses an ISM radio frequency band or a U-NII 5 GHz radio frequency band according to an embodiment of the present invention.
Figure 6:
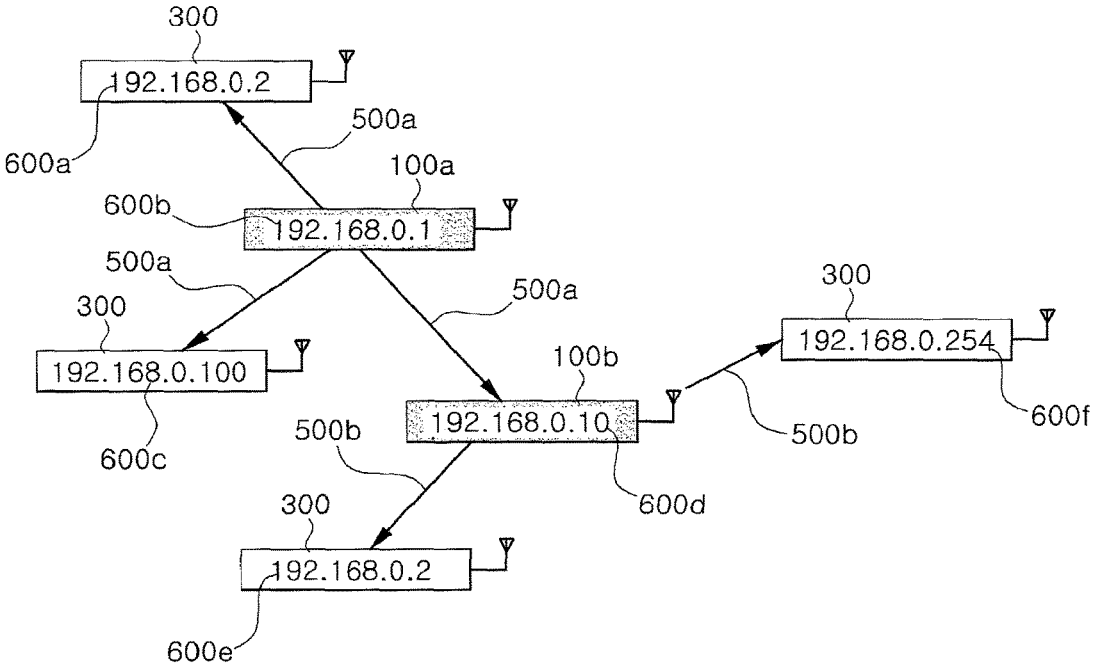
FIG. 6 is a view of an individual multimedia contents broadcasting service method in an individual multimedia contents broadcasting which uses an ISM radio frequency band or a U-NII 5 GHz radio frequency band according to an embodiment of the present invention.

FIG. 5 is a view of a relay broadcast method of an individual multimedia contents broadcasting equipment in an individual multimedia contents broadcasting which uses an ISM radio frequency band or a U-NII 5 GHz radio frequency band according to an embodiment of the present invention. FIG. 6 is a view of an individual multimedia contents broadcasting service method in an individual multimedia contents broadcasting which uses an ISM radio frequency band or a U-NII 5 GHz radio frequency band according to an embodiment of the present invention.

The relay broadcast system and method according to the present invention will be described with reference to FIGS. 5 and 6.

As shown in FIGS. 5 and 6, the individual multimedia contents broadcasting equipment 100b is capable of performing individual multimedia contents broadcast, and is capable of receiving and relaying the multimedia contents which are being broadcasted in another individual multimedia contents broadcasting equipment 100a. Namely, an individual broadcast mode or a relay mode is set by means of the operation unit 104a, a connection is requested to another individual multimedia contents broadcasting equipment 100a which is performing an individual broadcast by means of the operation of the processor 103a, and a private IP is allocated, and its registration information is transmitted. The multimedia contents, which are being individually broadcasted through the radio occupying channel 500a of the ISM radio frequency band or the U-NII 5 GHz radio frequency band 500 from another individual multimedia contents broadcasting equipment 100a, which is performing an individual broadcast, are received, and played back by means of the speaker 104d and the LCD 104e. In addition, the received multimedia contents are relayed to another individual multimedia contents broadcasting equipment (not shown), which is set in a receiving mode or a relay mode, by allocating a channel 500b which might be used in the ISM radio frequency band or the U-NII radio frequency band 500 except for the occupying channel 500a. The receiving terminal 300 might be connected to the individual multimedia contents broadcasting equipment 100a which performs an individual broadcast or might be connected to the individual multimedia contents broadcasting equipment 100b which relays an individual broadcast, which broadcasts are same. As shown in FIG. 6, the individual multimedia contents broadcasting equipment 100a defined with the private IP 192.168.0.1 (600b) allocates the private IP 192.168.0.2 (600a); 192.168.0.100 (600c) to the receiving terminal 300 which wants to receive a broadcast in a nearby region where is able to receive the individual broadcast, and allocates the private IP 192.168.0.10 (600d) to the individual multimedia contents broadcasting equipment 100b, which is in the current broadcast mode, for thereby providing an individual broadcast service through the occupying channel 500a. At this time, the individual multimedia contents broadcasting equipment 100b, which is in the relay broadcast mode and has received the allocation of the private IP 192.168.0.10 (600d), allocates the private IP 192.168.1.2 (600e); 192.168.1.254 (600f) to the receiving terminal 300 in the nearby region, and the individual broadcast is received through the available channel 500b. Here, the private IP and channels can be reused. The above features are not limited to the disclosed features of FIGS. 5 and 6.

INDUSTRIAL APPLICABILITY

As described above, the present invention relates a personal to multimedia contents broadcasting equipment and a method thereof which provide functions for broadcasting multimedia contents such as a text data, a symbol data, a music data, a sound data, an audio data, a video data, an image data, a photo data or something, with their intellectual properties belonging to individuals, respectively, to a specific receiving terminal by using an ISM radio frequency band or a U-NII 5 GHz radio frequency band As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

[1. A device for transmitting multimedia content, the device operating with an individual wireless connection to a vehicle's Electronic Control Unit (ECU), comprising:

a storing device configured to store multimedia contents;

an operation unit configured to receive a control signal from a user of the device;

a processor; and a radio communication unit configured to establish the individual wireless connection to the vehicle's ECU and a wireless connection to a mobile network, wherein the processor is configured to create multimedia contents comprising navigation information in real time in accordance with the control signal, and transmit the multimedia contents comprising navigation information to the vehicle's ECU via the individual wireless connection.]

[2. The device of claim 1, wherein the creating the multimedia contents comprising navigation information in real time by the processor comprises:

creating the multimedia contents comprising navigation information based on a stored map data in accordance with the control signal.]

[3. The device of claim 2, wherein the multimedia contents are created using any one or any combination of any two or more of a sound data, an audio data, a text data, and a video data, stored in the storing device.]

[4. The device of claim 1, wherein the processor is further configured to:

transmit the multimedia contents stored in the storing device to the vehicle's ECU via the individual wireless connection.]

[5. The device of claim 1, wherein the individual wireless connection is based on an Industrial, Science, and Medical (ISM) band.]

[6. The device of claim 1, wherein the device further comprises a DHCP IP allocator configured to allocate a private IP address to the vehicle's ECU while the radio communication unit establishes the individual wireless connection.]

[7. The device of claim 5, wherein the individual wireless connection is based on an IEEE 802.11 protocol.]

[8. The device of claim 5, wherein the individual wireless connection is based on a Bluetooth protocol.]

[9. A method for transmitting multimedia contents with an individual wireless connection to a vehicle's Electronic Control Unit (ECU), the method comprising:

receiving a control signal from a user by an operation unit of a device for transmitting multimedia content;

establishing the individual wireless connection to the vehicle's ECU and a wireless connection to a mobile network by a radio communication unit of the device for transmitting multimedia content;

creating multimedia contents comprising navigation information in real time in accordance with the control signal by a processor of the device for transmitting multimedia content;

storing the multimedia contents by a storing device of the device for transmitting multimedia content; and transmitting the multimedia contents comprising navigation information to the vehicle's ECU via the individual wireless connection by the processor of the device for transmitting multimedia content.]

[10. The method of claim 9, wherein the creating of the multimedia contents including navigation information further comprises:

creating the multimedia contents comprising navigation information based on a stored map data in accordance with the control signal by the processor of the device for transmitting multimedia content.]

[11. The method of claim 10, wherein the multimedia contents are created using any one or any combination of any two or more of a sound data, an audio data, a text data, and a video data, stored in a storing device.]

[12. The method of claim 9, further comprising:

transmitting the multimedia contents stored in a storing device to the vehicle's ECU via the individual wireless connection by the processor of the device for transmitting multimedia content.]

[13. The method of claim 9, wherein the individual wireless connection is based on an Industrial, Science, and Medical (ISM) band.]

[14. The method of claim 9, wherein the individual wireless connection is based on an IEEE 802.11 protocol.]

[15. The method of claim 9, wherein the individual wireless connection is based on a Bluetooth protocol.]

*16. A method of transmitting data by a communication device, the method comprising:*

*obtaining, by the communication device, first content data based on at least one of an audio signal and a video signal received by the communication device in real time;*

*obtaining, by the communication device, a device control command based on a user input signal;*

*generating, by the communication device in accordance with the device control command, multimedia content data based on one or more of the first content data and second content data, the second data being stored in the communication device; and*

*transmitting, by the communication device, the multimedia content data to one or more other devices,*

*wherein the user input signal-based device control command includes a transition between a first state in which the multimedia content data is generated from the first content data in real time without the second content data and a second state in which multimedia content data is generated by combining the second content data stored in the communication device and the first content data in real time, and*

*wherein the method further comprises obtaining a user selection to enable an authentication function for providing the multimedia content data only to a device from among the other devices, which obtains a permission according to an authentication procedure.*

*17. The method of claim 16, wherein the multimedia content data is generated based on third content data in addition to the one or more of the first content data and the second content data, and*

*wherein the third content data includes one or more of a text and a symbol.*

*18. The method of claim 16, further comprising displaying a status regarding at least one of other devices receiving the multimedia content data,*

*wherein the status includes at least one of information regarding wireless signal sensitivity, a number of connected one or more other devices, and a wireless connection status of each device that receives the multimedia content data through wireless connection among the at least one of other devices.*

*19. The method of claim 16, wherein information for installing a software for playing the multimedia content data is provided to the at least one of the other devices.*

*20. The method of claim 19, further comprising:*

*checking whether the software is installed in advance in the at least one of the other devices, and*

*wherein the information for installing the software is provided when the software is not installed in advance in the one or more other devices.*

*21. The method of claim 19, further comprising:*

*installing, by the at least one of the other devices, the software based on the information for installing the software.*

*22. The method of claim 16, further comprising:*

*displaying, by the communication device, a live image related to the multimedia content data transmitted by the communication device.*

*23. The method of claim 22, wherein the live image includes either alone or both a text and a symbol according to the user input signal-based device control command.*

*24. The method of claim 22, wherein the live image is obtained from the video signal detected in real time by a camera connected to or embedded in the communication device.*

*25. The method of claim 16, wherein the second content data is selected from among a plurality of contents stored in the communication device.*

*26. The method of claim 16, further comprising:*

*sharing the second content data with the at least one of the other devices.*

*27. The method of claim 16, wherein the generating the multimedia content data comprises:*

*synthesizing one or more of the first content data, the second content data, and third content data including one or more of a text and a symbol, as a data stream for the multimedia content data.*

*28. The method of claim 16, wherein the multimedia content data is generated by combining one or more of the first content data, the second content data, and third content data including one or more of a text and a symbol.*

*29. The method of claim 16, wherein the generating the multimedia content data comprises:*

*jointly encoding one or more of the first content data, the second content data, and third content data including one or more of a text and a symbol.*

*30. The method of claim 16, further comprising:*

*storing at least part of the multimedia content data.*

*31. The method of claim 16, further comprising:*

*receiving the audio signal in real time from at least one of an external microphone that is connected to the communication device or a microphone embedded in the communication device,*

*receiving the video signal in real time from at least one of an external camera that is connected to the communication device or a camera embedded in the communication device; and*

*receiving the user input signal from either alone or in combination of two or more of a touch screen input, a keyboard input, a mouse input and a keypad input.*

*32. The method of claim 16, further comprising:*

*selecting, by the communication device, the second content data as a background image, and*

*wherein the background image is one of images stored in the communication device.*

*33. The method of claim 16, wherein the multimedia content data transmitted by the communication device is delivered via a network node in the Internet.*

*34. The method of claim 16, wherein the multimedia content data is transmitted through a wireless signal, an IEEE 802.11-based signal, or an internet protocol (IP)-based network.*

*35. The method of claim 16, wherein the multimedia content data transmitted by the communication device is broadcasted to the at least one of the other devices through a network.*

36. The method of claim 16, further comprising:

receiving, from the at least one of the other devices, another multimedia content data;

displaying an image based on the other multimedia content data; and playing an audio based on the other multimedia content data.

37. The method of claim 16, wherein the multimedia content data transmitted by the communication device is output in the at least one of the other devices in a manner of streaming.

38. The method of claim 16, wherein the multimedia content data is generated in one of a plurality of content generation modes including a single input mode and a dual input mode.

39. The method of claim 38, wherein:

in the single input mode, the multimedia content data is generated by selecting one of the first content data and the second content data; and in the dual input mode, the multimedia content data is generated by combining the first content data and the second content data.

40. The method of claim 16, wherein a sharable format of the second content data includes at least one of an image format, a video format, a text format, a music format and a sound format.

41. The method of claim 16, further comprising:

determining, by the communication device, whether to include the first content data to the multimedia content data based on the device control command.

42. The method of claim 16, wherein the multimedia content data is provided without the authentication procedure based on non-enablement of the authentication function.

43. A non-transitory computer-readable medium having recorded thereon program codes for performing a method of transmitting data by a communication device, the method comprising:

obtaining, by the communication device, first content data based on at least one of an audio signal and a video signal received by the communication device in real time;

obtaining, by the communication device, a device control command based on a user input signal;

generating, by the communication device in accordance with the device control command, multimedia content data based on one or more of the first content data and second content data, the second data being stored in the communication device; and transmitting, by the communication device, the multimedia content data to one or more other devices, wherein the user input signal-based device control command includes a transition between a first state in which the multimedia content data is generated from the first content data in real time without the second content data and a second state in which multimedia content data is generated by combining the second content data stored in the communication device and the first content data in real time, and wherein the method further comprises obtaining a user selection to enable an authentication function for providing the multimedia content data only to a device from among the other devices, which obtains a permission according to an authentication procedure.

44. A communication device comprising:

at least one processor which obtains first content data based on at least one of an audio signal and a video signal received by the communication device in real time, obtains a device control command based on a user input signal, and generates, in accordance with the device control command, multimedia content data based on one or more of the first content data and second content data, the second data being stored in the communication device;

a transceiver which transmits, under control of the at least one processor, the multimedia content data to at least one of other devices;

a display which displays, under control of the at least one processor, a live image related to the multimedia content data transmitted; and a storage which stores the second content data, wherein the user input signal-based device control command includes a transition between a first state in which the multimedia content data is generated from the first content data in real time without the second content data and a second state in which multimedia content data is generated by combining the second content data stored in the communication device and the first content data in real time, and wherein the at least one processor obtains a user selection to enable an authentication function for providing the multimedia content data only to a device from among the other devices, which obtains a permission according to an authentication procedure.

45. The communication device of claim 44, wherein the multimedia content data is generated based on third content data in addition to the one or more of the first content data and the second content data, and wherein the third content data includes one or more of a text and a symbol.

46. The communication device of claim 45, wherein the multimedia content data is generated by combining one or more of the first content data, the second content data, and the third content data, in accordance with the device control command.

47. The communication device of claim 44, wherein the multimedia content data is generated in one of a plurality of content generation modes including a single input mode and a dual input mode.

48. The communication device of claim 47, wherein:

in the single input mode, the multimedia content data is generated by selecting one of the first content data and the second content data; and in the dual input mode, the multimedia content data is generated by combining the first content data and the second content data.

49. The communication device of claim 47, wherein the display displays a status regarding the at least one of other devices receiving the multimedia content data.

50. The communication device of claim 49, wherein the status includes at least one of information regarding a number of the at least one of other devices, and a wireless connection status of a device that receives the multimedia content data through wireless connection among the at least one of other devices.

51. The communication device of claim 44, further comprising at least one of:

an user interface which receives the user input signal based on at least one of a touch screen of the display, a keyboard, a mouse and a keypad;

an audio interface which obtains the audio signal in real time based on an external microphone or an embedded microphone; and

*a video interface which obtains the video signal in real time, based on an external camera or an embedded camera,*

*wherein the transceiver includes at least one of an IEEE 802.11-based signal transceiver or a cellular signal transceiver.*

* * * * *